United States Patent
Skotte et al.

(10) Patent No.: US 7,444,811 B2
(45) Date of Patent: Nov. 4, 2008

(54) WAVE POWER DEVICE

(76) Inventors: Asbjorn Skotte, Hatlen 1, N-6240 Orskog (NO); Tov Westby, Aastubben 1, N-0381Oslo (NO)

( * ) Notice: Subject to any disclaimer, the term of this patent is extended or adjusted under 35 U.S.C. 154(b) by 0 days.

(21) Appl. No.: 10/599,481

(22) PCT Filed: Apr. 1, 2005

(86) PCT No.: PCT/NO2005/000112

§ 371 (c)(1),
(2), (4) Date: Feb. 22, 2007

(87) PCT Pub. No.: WO2005/095791

PCT Pub. Date: Oct. 13, 2005

(65) Prior Publication Data

US 2007/0193265 A1    Aug. 23, 2007

(30) Foreign Application Priority Data

Apr. 2, 2004   (NO) ................................. 20041374

(51) Int. Cl.
*F03C 1/00*    (2006.01)
(52) U.S. Cl. .............................. 60/498; 60/497; 60/502
(58) Field of Classification Search .......... 60/495–498, 60/502
See application file for complete search history.

(56) References Cited

U.S. PATENT DOCUMENTS

| 3,546,473 | A | * | 12/1970 | Rich | 290/42 |
| 4,622,473 | A | * | 11/1986 | Curry | 290/53 |
| 4,742,241 | A | * | 5/1988 | Melvin | 290/53 |
| 5,696,413 | A | * | 12/1997 | Woodbridge et al. | 310/15 |
| 6,020,653 | A | * | 2/2000 | Woodbridge et al. | 290/53 |
| 6,644,027 | B1 | * | 11/2003 | Kelly | 60/498 |

FOREIGN PATENT DOCUMENTS

| DE | 4338103 | * | 11/1995 |
| WO | WO 2004/027257 | * | 4/2004 |

* cited by examiner

*Primary Examiner*—Hoang M Nguyen
(74) *Attorney, Agent, or Firm*—Dennison, Schultz & MacDonald

(57) ABSTRACT

Wave-power device, with a plurality of floating bodies (12) arranged in at least two parallel rows for vertical movement caused by wave movements. Each floating body is connected to a generator (22) for the generating of electrical energy during the vertical movement. The floating bodies are jointed to a raft (11) which can be relocated on the water and can be moored at an arbitrary place of use. The floating bodies (12) are connected to vertical supporting bars (14), which are held between an upper lattice-like structure (15, 16) and a lower lattice-like structure (17, 18), and each of the vertical supporting bars (14) is connected to an electric generator (22).

13 Claims, 2 Drawing Sheets

WAVE POWER DEVICE

BACKGROUND OF THE INVENTION

The invention relates to a device for the converting of kinetic energy in water waves into electrical energy, here called a wave-power device.

From Japanese patent specification 55160967 (Yasuhiro 1980) it is known to arrange a plurality of floating bodies in rows on a raft, with bars which extend upwardly from each floating body to a linear generator. Such a structure can be towed carefully, and can be operated without another connection to the bottom other than mooring chains or hawsers. However the towering generator parts create potential problems during storms. Therefore, this design did not receive attention for any practical use.

From German patent publication 43 38 103 (Klemm 1995) a wave-power device is known, where there is a row of stator tubes with coils, which are fastened in a frame, are inserted flotation gears with permanent magnets, which form a rotor of a linear generator. The capacity of such a generator will be too small for feeding electricity into the public mains and producing profit as an energy supplier.

From U.S. Pat. specification No. 3,546,473 (Rich 1969) it is known to make an energy converter with a floating body which forms a moving part of a linear generator, while the other parts are anchored to the seabed. This solution results in problems with the tides, and is calculated for a very low profit.

From U.S. Pat. specification No. 4,742,241 (Melvin 1988) it is known to couple together several energy converters in an electro-hydraulic system, as several floating bodies each drives its reciprocating pump which is coupled in parallel for the operation of one or several hydraulic motors. This construction will be expensive on account of the many pumps which have to be produced with high precision, and which are exposed to operational disturbances in a demanding environment.

From U.S. Pat. specification No. 4,622,473 (Curry 1986) a similar reciprocating piston-type system as mentioned above is known, which is coupled to a platform structure. Also, in this case, the costs will be high, and the many mechanical elements will be exposed to wear and climatic influence.

SUMMARY OF THE INVENTION

The main object of the invention, therefore, is to create a wave-power device which has lower investment costs in relation to the electricity generated than known constructions, and which can be operated with little maintenance. The aim is to be able to place many such units in sea areas with waves.

It is a particular object to create a wave-power device which can be built up with simple parts, and which makes it easy to couple together several floating units to a power station.

According to the invention, it becomes possible to build up a wave-power device, that means a construction for converting wave energy to electrical energy, which is assembled from reasonable parts, where the costs of capital and maintenance are held low, so that electricity can be supplied at a competitive rate. A wave-power device, according to the invention can be made resistant to bad weather, and other climatic strains.

Several details of the invention can be learnt from the following description of an example.

BRIEF DESCRIPTION OF THE DRAWINGS

Below, the invention is described more closely with reference to an example, where FIG. 1 schematically shows a side view of a wave-power device designed according to the invention, FIG. 3 shows a sectional side view of a floating body which is adjusted for use with the wave-power device according to FIGS. 1 and 2, while

DESCRIPTION OF THE PREFERRED EMBODIMENTS

Figure 1:
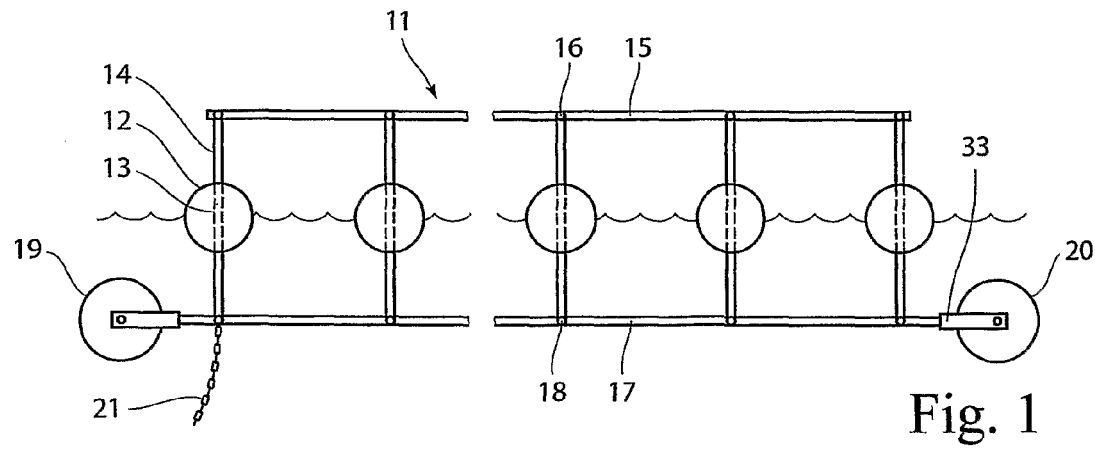
Figure 2:
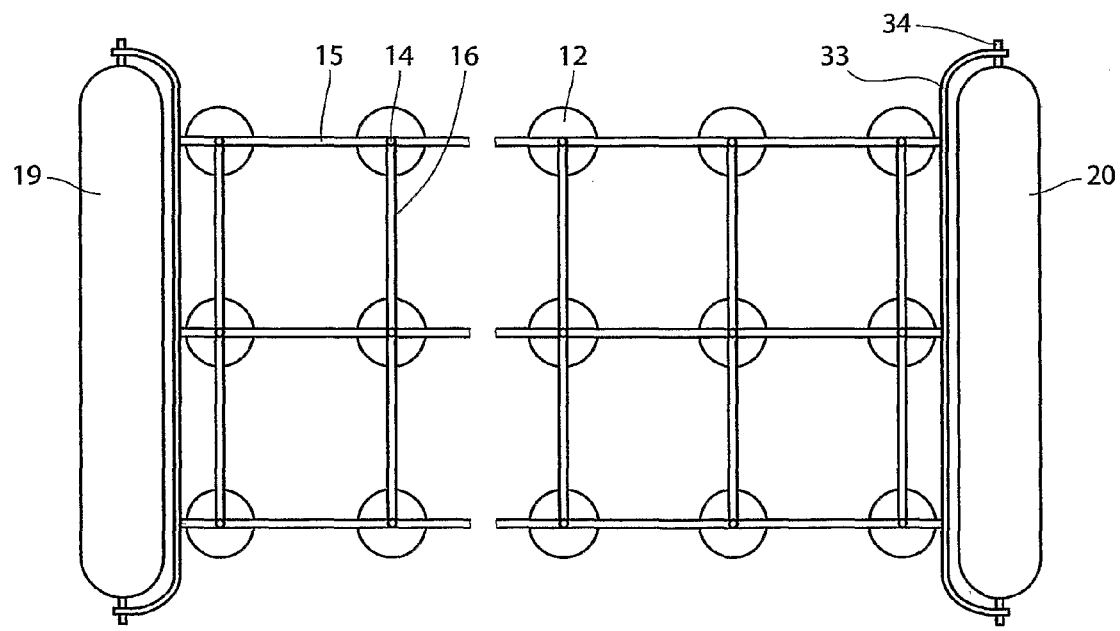
FIG. 2 shows a top view of the wave-power device according to FIG. 1.

In FIGS. 1 and 2, a wave-power device 11 with floating bodies 12 arranged in a lattice-like structure is shown. Shown is a device with three rows, with five floating bodies in each row, but it is hinted that there can be arranged some more floating bodies in each row. This number is chosen as an illustration of a possible solution, as the dimensioning can vary within wide limits, particularly in view of the number in the longitudinal direction.

The floating bodies 12 are shown to be spherical, but they can have other geometrical shapes, for example discus-form or an upright cylinder-form. Each floating body 12 has a vertically directed, cylindrical opening 13, which is approximately of the same dimension as a vertical supporting bar 14, so that the floating body 12 can move up and down in a vertical direction on its supporting bar 14, with relatively little clearance. The opening 13 can be encircled at its underside with a suitable scraper which enables the supporting bar 14 to be kept free of fouling.

The upper and lower ends of the supporting bars 14 are connected with a network of connection bars 15, 16 and 17, 18 on top and at the underside, respectively, where these run lengthwise and crosswise, respectively. The connection bars 15-18 can be made of semi flexible compound material, for example fibre glass reinforced plastics, with appropriate juncture elements (not shown).

At each side of the wave-power device 11, outside of the floating bodies 12, is arranged a crosswise directed buoyancy tank or pontoon 19, 20 which can be completely or partially be filled with water. The buoyancy tanks 19, 20 are fastened to lengthwise directed lower connection bars 17, with the aid of a crosswise directed strut 33, which, at its ends, is fastened to the axis 34 of the buoyancy tanks 19, 20. In this way it is possible to turn the buoyancy tanks 19, 20 for gaining access for the removal of fouling from the underside.

When the wave-power device is activated after tow-out from a production site, the buoyancy tanks 19, 20 are filled with so much water that they will be lowered down to a depth, where the buoyancy tanks and the bearing structure stays mainly insensitive to wave movements. In this position, the device can be secured with mooring chains 21 at the corners of the network of the lower connection bars 17, 18. The mooring chains 21 can be anchored to a concrete block placed on the seabed. With an alternative embodiment, four mooring chains can be assembled to a juncture under the wave-power device, as this juncture is anchored to the bottom. In this way the wave-power device according to the invention, can be moored to a single mooring point during bad weather.

Figure 3:
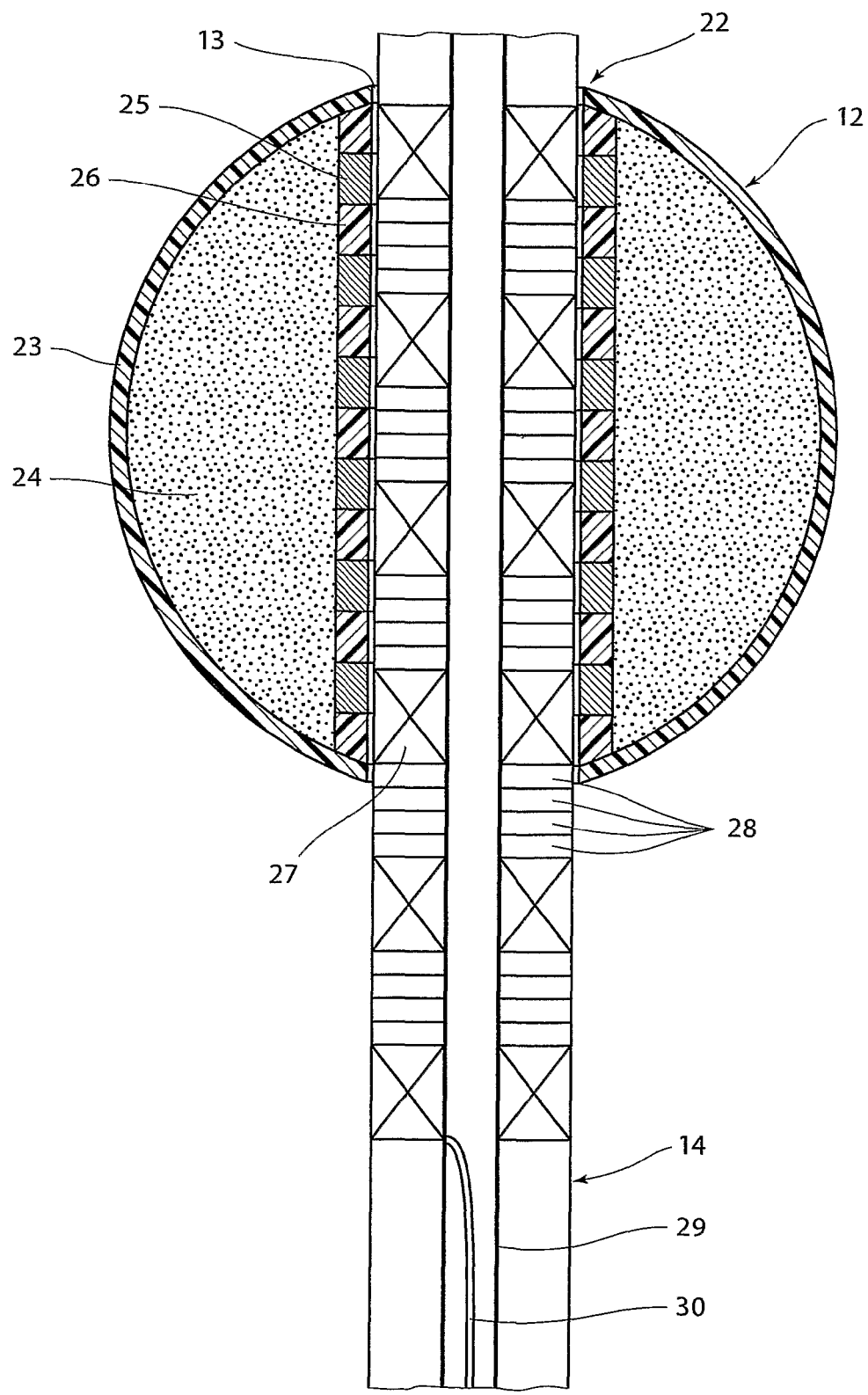

FIG. 3 shows an example of the structure of a floating body 12, and the assigned supporting bar 14 with an embodiment in which is integrated a linear generator 22. Each floating body can have a volume from 40-3000 $dm^3$, and can be made with a sperical shell 23, for instance of fibre glass reinforced plastics, which is filled with foam material 24. The opening 13 for the supporting bar 14 is formed of a tubular structure of annular permanent magnets 25, placed axially to each other, and separated by nonmagnetic distance pieces 26, for example by embedding with plastic or sticking. The tubular structure of the permanent magnets 25, which can be of circular or rectangular cross-section at its opening, forms the rotor or moving part of the linear generator 22.

The stator of the linear generator is built up on the supporting bar 14. In a part of the area covered by the floating body 12, it includes a row of coils 27 which are placed alternately with a row of iron elements 28. As a central support in the supporting bar 14, a tube or compact bar 29 of suitable material may be used. By using a tube it can serve as a channel for the carrying of a power cable 30 down to the lower connection bars 17, 18, and from there to a converter. In the supporting bar 14, there can also be placed a capacitor for stabilizing the generated current, and possibly a rectifier.

Figure 4:
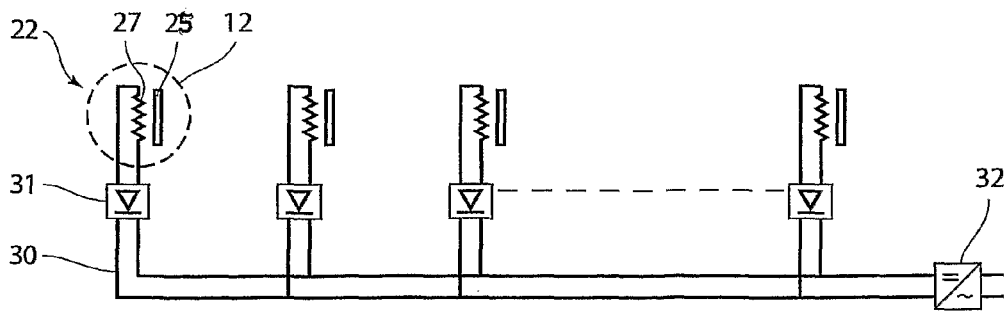
FIG. 4 shows a coupling pattern for the wave-power device according to FIGS. 1-3.

FIG. 4 shows a diagram of the electric circuit of a wave-power device according to the invention. For each floating body 12, there is shown a coil 27, a permanent magnet 25, and a rectifier 31. All partial generators 22 are connected in parallel to a DC/AC-converter 32, which can deliver regulated alternating current to an outer network.

Further, the buoyancy tanks 19, 20 can be filled for lowering of the wave-power device down in the sea, so that the floating bodies 12 go down to a level and thus remove any risk of damage during bad weather.

With an alternative embodiment, there is integrated in each floating body, an electric generator with a rotating armature with permanent magnets, where the transmission of forces takes place over a pitch rack which is engaged by a gear for driving the rotating armature, which in this way converts wave movements to electrical energy. The energy transfer from the generators in the floating bodies can be done with flexible power cables.

With a further alternative embodiment, each floating body can be fastened to a vertical bar which is guided in guides which are arranged at the cross-over of the connection bars 15-18. This vertical bar can be provided with an upper or a lower partial pitch rack which can drive a generator with a rotating armature.

The invention claimed is:

1. Wave-power device comprising:
a plurality of floating bodies arranged in at least two parallel rows, each floating body being connected to a linear energy converter for converting the wave energy to kinetic energy in a mechanical system connected to an electrical generator;
an upper and a lower carrying structure between which the floating bodies are arranged;
vertical supporting bars connected to the floating bodies, the vertical supporting bars held between the upper carrying structure and the lower carrying structure; and
an extended buoyancy tank connected with the lower carrying structure at opposite structure sides, the buoyancy tanks being constructed and arranged for filling with water for lowering the wave-power device into the sea, such that the floating bodies are submersed to a level to reduce risk of damage during bad weather,
wherein the electric generator is integrated between said vertical supporting bars and a corresponding floating body.

2. Wave-power device according to claim 1, wherein the vertical supporting bars are integrated with stator coils and non-magnetic iron elements, and each floating body has a centrally located tube containing permanent magnets.

3. Wave-power device according to claim 2, wherein the stator coils of the generators are connected to a rectifier and to a DC/AC-converter which is common to all of the generators in the wave-power device.

4. Water power device according to claim 1, wherein the buoyancy tanks are rotatably coupled at ends thereof for rotation of the buoyancy tanks for removal of fouling.

5. Wave-power device according to claim 1, additionally comprising a buoyancy tank arranged at two opposite sides of the carrying structure which bears the floating bodies, which buoyancy tanks are constructed and arranged to be at least partly filled with water, the buoyancy tanks being lowered to a depth in the water, such that the carrying structure of the floating bodies stays substantially stable and unaffected by wave movements.

6. Wave-power device according to claim 1, wherein the upper carrying structure includes lengthwise and crosswise directed connection bars having Junctures which form holders for the vertical supporting bars.

7. Wave-power device according to claim 1, wherein the lower carrying structure includes lengthwise and crosswise directed connection bars having junctures forming holders for the vertical supporting bars.

8. Wave-power device according to claim 2, wherein the vertical supporting bars are integrated with stator coils and iron elements, and each floating body has a centrally located tube of permanent magnetic material.

9. Wave-power device according to claim 1, wherein the generators have stator coils connected to a rectifier and to a DC/AC-converter which is common to all of the generators in the wave-power device.

10. Wave-power device according to claim 9, wherein the supporting bars accommodate capacitors and/or rectifiers for the generated current.

11. Wavepower device according to claim 5, wherein the buoyancy tanks are rotatably coupled at its ends, preferably at its longitudinal axles, to be able to rotate the buoyancy tanks for removal of fouling.

12. Wave-power device according to claim 11, wherein the buoyancy tanks are rotatably coupled at longitudinal axes thereof.

13. Wave-power device according to claim 5, wherein the buoyancy tanks are filled with water for lowering the wave-power device down into the sea, so that the floating bodies descends to a level at which risk of damage during bad weather is reduced.

* * * * *